(12) United States Patent
Winton, III

(10) Patent No.: US 9,975,167 B2
(45) Date of Patent: May 22, 2018

(54) PROCESS TO CUT COAX CABLE

(71) Applicant: Winton Machine Company, Suwanee, GA (US)

(72) Inventor: George R. Winton, III, Lawrenceville, GA (US)

(73) Assignee: WINTON MACHINE COMPANY, Suwanee, GA (US)

( * ) Notice: Subject to any disclaimer, the term of this patent is extended or adjusted under 35 U.S.C. 154(b) by 0 days. days.

(21) Appl. No.: 15/375,920

(22) Filed: Dec. 12, 2016

(65) Prior Publication Data

US 2017/0093137 A1    Mar. 30, 2017

Related U.S. Application Data

(62) Division of application No. 14/020,031, filed on Sep. 6, 2013.

(51) Int. Cl.
| | |
|---|---|
| *B21D 43/28* | (2006.01) |
| *B21D 7/024* | (2006.01) |
| *H02G 1/00* | (2006.01) |
| *B21D 11/10* | (2006.01) |

(52) U.S. Cl.
CPC ........... *B21D 43/285* (2013.01); *B21D 7/024* (2013.01); *B21D 11/10* (2013.01); *H02G 1/005* (2013.01)

(58) Field of Classification Search
CPC ...... B21D 43/285; B21D 11/10; B21D 7/063; B21D 9/073; B21D 9/07; B21D 7/02; B21D 7/024; H02G 1/005
See application file for complete search history.

(56) References Cited

U.S. PATENT DOCUMENTS

| | | | | |
|---|---|---|---|---|
| 4,049,026 A | * | 9/1977 | Del Fabro | B21D 11/12 140/105 |
| 4,248,273 A | * | 2/1981 | Marcello | B21D 11/12 140/105 |
| 4,625,531 A | * | 12/1986 | Lafrasse | B21D 7/024 72/150 |
| 4,630,459 A | | 12/1986 | Elliot | 226/149 |
| 5,901,596 A | * | 5/1999 | Tetzloff | B21D 7/024 72/134 |

(Continued)

OTHER PUBLICATIONS

Winton Machine Marketing Literature, 2012.
Pines Technology Marketing Literature, approximately 1980.

*Primary Examiner* — Shelley Self
*Assistant Examiner* — Mohammad Yusuf
(74) *Attorney, Agent, or Firm* — Stein IP, LLC

(57) ABSTRACT

A computer numerical control (cnc) bending machine used to bend and then cut a specific programmed profile from a long length of cable comprising: a base, a carriage, a bend head and a saw; the carriage includes a spindle to rotate the cable, the carriage is also able to transport the cable in a linear fashion; the bend head comprises a clamp and a wiper roller and a bend die; after a last bend is formed, the clamp and wiper roller are retracted away from the bend die; the carriage is then able to then transport the cable forward away from the saw, the spindle is then able to rotate the cable out of the plane of the bend, the carriage is then able to transport the cable back toward the saw; the saw is then able to sever the cable such that a last leg length adjacent to the last bend which is shorter than the fixed distance between the saw and the bend die.

1 Claim, 6 Drawing Sheets

(56) References Cited

U.S. PATENT DOCUMENTS

| | | | |
|---|---|---|---|
| 7,104,100 B2 * | 9/2006 | Saegusa | B21D 7/024 72/149 |
| 8,234,772 B2 | 8/2012 | Locher et al. | 29/564.4 |
| 8,561,449 B2 * | 10/2013 | Veit | B21D 7/12 72/150 |

* cited by examiner

PROCESS TO CUT COAX CABLE

CROSS-REFERENCE TO RELATED APPLICATIONS

This application is a divisional of U.S. application Ser. No. 14/020,031, filed Sep. 6, 2013 in the U.S. Patent and Trademark Office. All disclosures of the document named above are incorporated herein by reference.

BACKGROUND OF THE INVENTION

1. Field of the Invention

Aspects of the present invention relate to the cutting of semi-rigid coax cable on a computer numerical control (cnc) cable bending machine. More particularly, aspects of the present invention relates to the length of material remaining between the last formed bend and the adjacent end of the cable after the saw has severed the formed part from a long length of straight cable.

2. Description of the Related Art

Semi-rigid coax cable (cable) is used to transmit electrical signals. Having the ability to cut the cable accurately is important for the quality of the transmitted signal to remain high. For decades the cutting process of a bent profile has been accomplished by either a stand alone powered bench saw or a powered saw integrated into a cnc cable bending machine. The saw on a cable bending machine is mounted such that a fixed distance exists between the saw blade (cutting plane) and the center of a bend die. This distance is often attempted to be as short as possible. However, there is a minimum distance permissible before the saw blade starts to cut into the bend tooling. This has been a limitation of this type of cutting process for decades. This distance is often referred to in the cable bending industry as the minimum last leg length. The minimum last leg length therefore defines how short the last leg can be processed on a specific cnc bending machine. Thus, the last leg length is the length of the straight portion of the cable from the end of the cable to the bend that is formed therein.

During the normal course of bending coax cable, a cnc bending machine often accepts a long length of semi-rigid coax cable to process. From this long length of cable, several individual parts can be fabricated provided that the cnc bending machine has an integrated saw as part of the function of the overall system. When a saw exists within the system, a typical user of the bending machine will program the machine to make one or more specific bends within a cable. After the last bend has been processed, the controller on the machine may instruct the user to cut the cable. Normally the system can move the cable forward after the last bend to make the cut, but the system has been unable to pull the cable backwards to make a cut because the last bend formed in the cable is wrapped (hooked) around the bend tooling.

Some cables are designed with a last leg length less than the minimum allowable last leg length as specified by the manufacturer of the cable bending machine. When this happens, the user of the bending equipment who is fabricating the bent coax cable must perform a secondary trim operation to further remove material from the cable's end to meet the required last leg length.

Over the years, Pines Technology (Westlake, Ohio) has built cnc cable bending equipment with an integrated saw to cut semi-rigid coax cable on a cnc bending machine. Their equipment, as described above, has a fixed distance from the plane of cut to the center of the bend die. This fixed distance determines the minimum last leg length that can be processed on the cable bender. It has never been considered obvious to backup and cut the cable because the last bend formed in the cable is wrapped (hooked) around the bend tooling.

Likewise, Winton Machine (Suwanee, Ga.) has built cnc cable bending equipment with an integrated saw to cut semi-rigid coax cable. Their equipment, as described above as well, has a fixed distance from the plane of cut to the center of the bend die. This fixed distance determines the minimum last leg length that can be processed without using a secondary cutting operation. It has never been considered obvious to backup and cut the cable because the last bend formed in the cable is wrapped (hooked) around the bend tooling. Backing up would have a tendency to unbend the cable and thus result in a non-conforming profile.

The hardship over the years when bending with an integrated cutting device has been to live with the minimum last leg length as specified by the machine tool builders and perform with a secondary trim operation as needed. The secondary trim operation adds to the cost of goods sold.

U.S. Pat. No. 8,234,772 assigned to Schleuniger does provide for cutting a flexible cable while offering a means to move the cable forward and backwards prior to cutting. However, Schleuniger does not provide a means for bending in the same apparatus. Also. Schleuniger makes use of a shear type cut and a shear type cut has been known to damage the ends of semi-rigid coax cable. It would not have been obvious to add a bending operation to this type of equipment because the apparatus of the cutting process would get in the way of bending the most simplistic profile.

SUMMARY OF THE INVENTION

Accordingly, it is an object of the present invention to reduce the minimum last leg length allowable on a cnc coax bending machine when the distance between the plane of cut and the center of the bend die is fixed.

It is another object of the present invention to eliminate a secondary trimming operation.

It is still another object of the present invention to allow a user to reduce the cost of goods sold by eliminating time consuming secondary trim operations.

Additional objects and advantages of the invention will be set forth in part in the description which follows and, in part, will be obvious from the description, or may be learned by practice of the invention.

BRIEF DESCRIPTION OF THE DRAWINGS

The above objects and advantages of the present invention will become more apparent by describing in detail preferred embodiments thereof with reference to the attached drawings in which:

FIG. 2 also shows a bent cable residing in the plane of bend with the last bend still formed (hooked) around the bend die;

FIG. 7 also shows the cable shifted out in the positive Z direction, allowing the cable to clear the bend die as the cable retracts in the negative X direction.

DETAILED DESCRIPTION OF THE EMBODIMENTS

Figure 1:
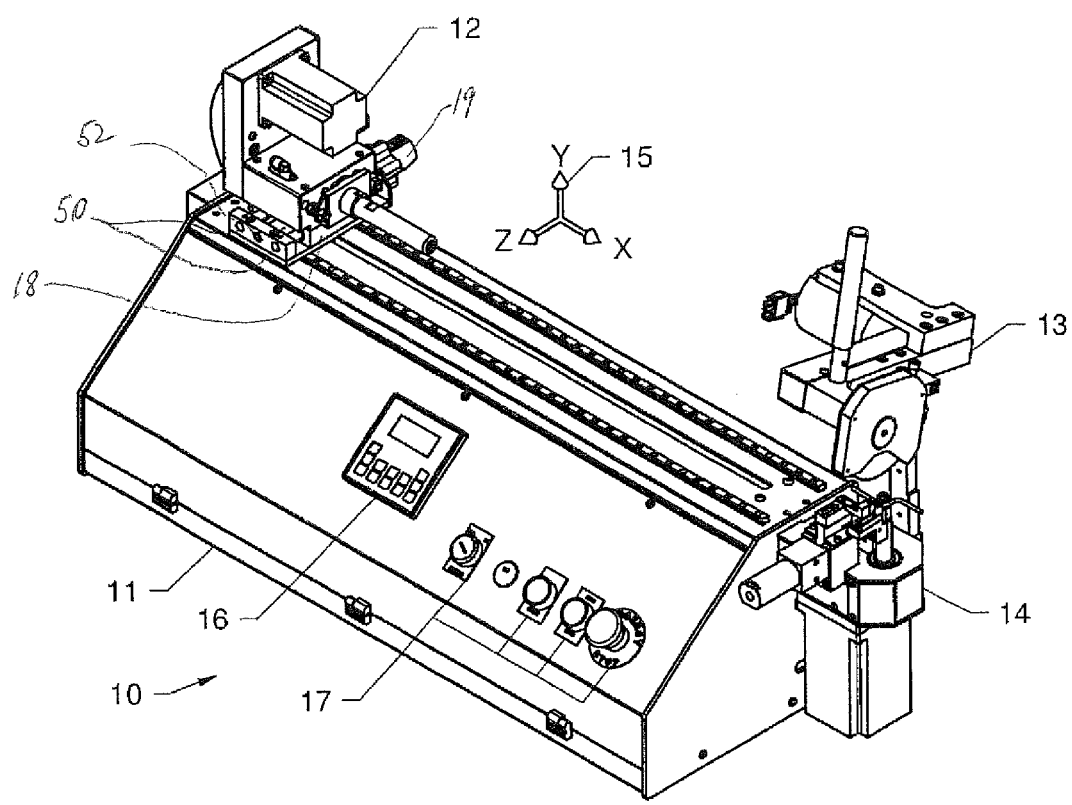
FIG. 1 shows an isometric view of a cnc bending machine with a powered saw that is used to bend & cut semi-rigid coax cable from a long length of straight cable.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

With reference to FIG. 1, a cable bending machine 10 is shown. The cable bending machine 10 includes a base 11, a carriage 12, a saw 13, and a bend head 14. A base 11 includes a computer 16 and various switches 17.

A portion of the carriage 12, a spindle housing 18, can move in the Z direction. The spindle housing 18 supports the spindle 26. The spindle housing 18 slides along rails 50,52 to move along the Z axis relative to the overall carriage 12 structure. A device 19 is able to move the spindle housing 18, and thus the spindle 26, along rails 50,52 in the Z axis direction.

An axis indicator 15 is shown to further describe the bending machine 10. The axis indicator 15 is a three dimensional visualization aid and is not part of the bending machine 10. The axis indicator 15 shows three arrows labeled X, Y, and Z. The positive directions of the X, Y, and Z axes are indicated by the pointed direction of each individual arrow. In general, a negative X direction is opposite a positive X direction. The same is true for the Y and Z directions.

Figure 2:
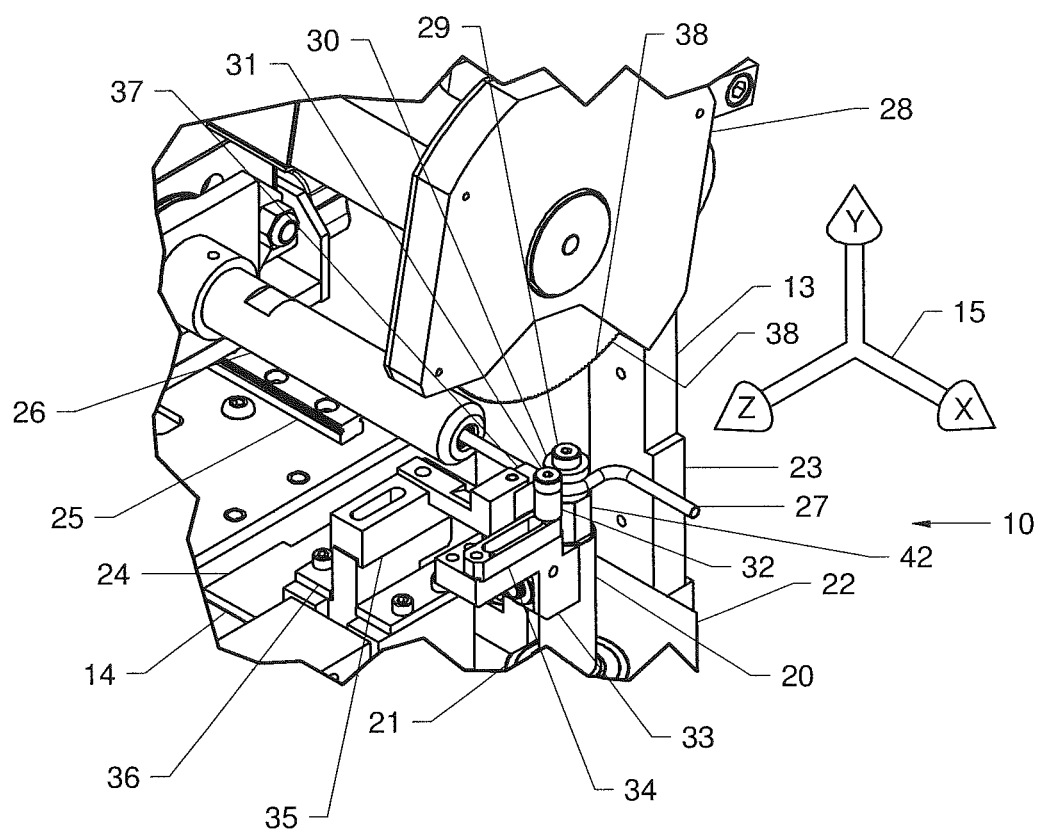
FIG. 2 shows an isometric close up of the bending head from FIG. 1 with the carriage up close to the bend head assembly.
Figure 3:
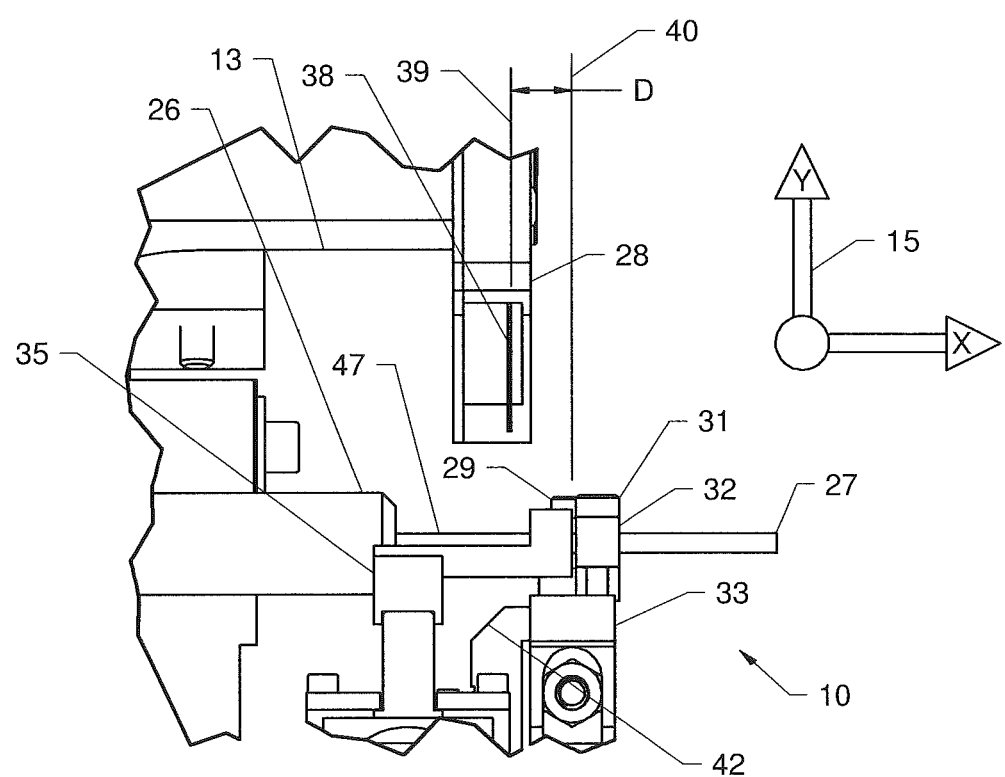
FIG. 3 shows a side view of FIG. 2.

From FIGS. 2 and 3, a cable 27 is shown in a bent configuration. It is the purpose of the bending machine 10 to bend the cable 27 into a specific shape starting with a long straight cable 47. The cable 47 is shown between a spindle 26 and a bend die 30. The bend die 30 is fixed in position relative to saw the 13. The cable 47 and the cable 27 are initially one continuous cable. The base 11 is used to support all the necessary electronics needed to provide for bending the cable 27.

The carriage 12 is a three axis device used to manipulate the cable 27 as it is being processed during a bending operation. The carriage 12 is able to transport the cable 47 forwards and backwards parallel to the X axis along a rail 25. The carriage 12 supports the spindle 26. The spindle 26 is able to grip the cable 47 and rotate about an axis parallel to the X axis. At certain times during a forming process, the cable 47 is held captive by spindle 26. The spindle 26 is also able to shift the cable 47 in the negative and positive Z directions.

The saw 13 includes a guard 28, a saw blade 38, and a saw support post 23. The saw blade 38 is circular in nature and is powered to rotate about an axis parallel to the X axis. The saw support post 23 provides a foundation for the saw blade 38 during its normal course of operation. The saw support post 23 is attached to the base 11. The saw blade 38 is able to translate (move) in a plane parallel to a plane that contains both the Y and Z axes.

Figure 4:
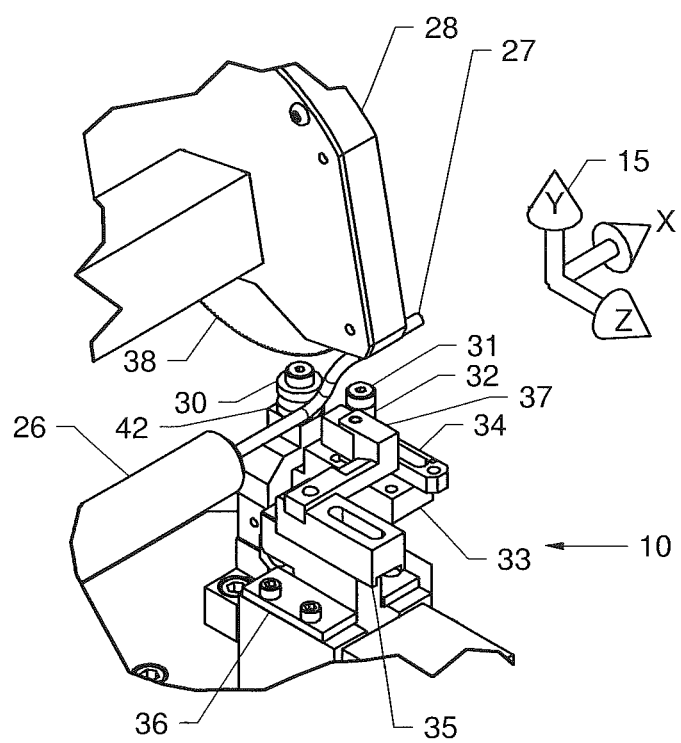
FIG. 4 shows an alternate isometric view close up of the bend head with the carriage up close to the bend head. In this view, the cable is rotated out of the plane of bend with the clamp die and wipe roller retracted allowing the cable to be rotated out of the plane of bend.

From FIGS. 2, 3, and 4, the bend head 14 includes the bend die 30. The bend die 30 is held captive by a screw 29. The screw 29 threads into a bolster 42. The bolster 42 mounts to a bend head frame 24. The bend head frame 24 is supported by the base 11.

Concentric with the bend die 30 is a main bend spindle 20. The main bend spindle 20 is parallel to the Y axis. The main bend spindle 20 is able to rotate about an axis parallel to the Y axis. The main bend spindle 20 is prevented from linear motion. However, it is a bearing 21 that allows the main bend spindle 20 to freely rotate about the axis parallel to the Y axis. Attached to the main bend spindle 20 is a wiper base 33. The wiper base 33 supports a wiper arm 34. The wiper arm 34 supports a wiper roller 32. The wiper roller 32 is held captive by a screw 31.

From FIG. 2, the wiper arm 34 is able to slide relative to the wiper base 33 in a direction parallel to the Z axis through the use of an air cylinder (not shown). As the main bend spindle 20 rotates, so does the attached wiper base 33 and wipe arm 34. As the main bend spindle 20 rotates, the relative motion between the wiper base 33 and the wiper arm 34 is still permissible yet not always parallel to the Z axis.

Also supported by the bend head frame 24 is a clamp base 36. The clamp base 36 supports a clamp slide 35. The clamp slide 35 supports a clamp 37. The clamp 37 is able to move along an axis parallel to the Z axis.

From FIGS. 2 and 3, the saw blade 38 and the screw 29 that locates the bend die 30 are separated by a fixed distance D in the X direction. The center of screw 29 is concentric with the bend die 30 as well as the spindle 20. A line 40 is shown in FIG. 3 and is considered to be concentric with the bend die 30. The line 40 is parallel to the Y axis. A cut plane 39 is considered to be parallel to (and coincidental with) the saw blade 38 and perpendicular to the X axis. The distance D is considered to be the fixed distance from the saw blade 38 to the center of the bend die 30, in the X axis direction.

Figure 5:
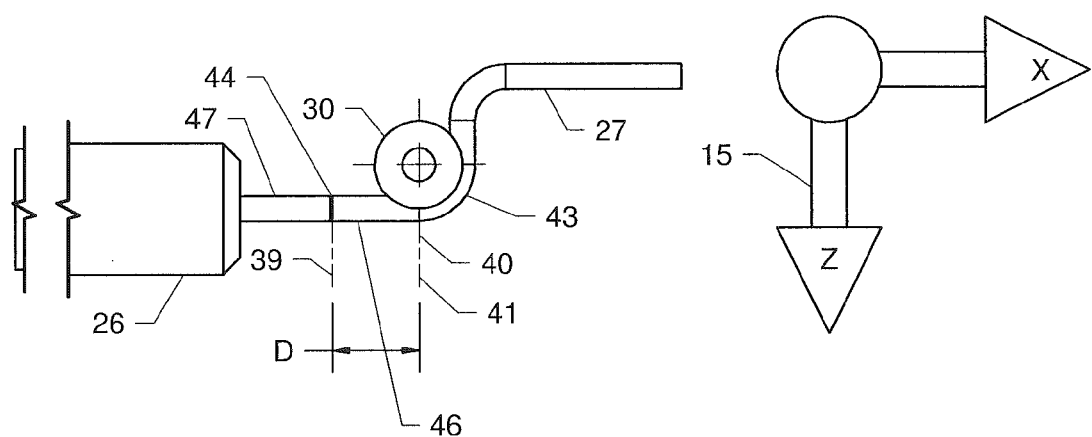
FIG. 5 shows a top view of a bent cable laying in the plane of bend with its relation to the bend die right after a bend has been completed.

FIG. 5 shows the cable 47 and its relationship to the bend die 30 after a bend 43 has been formed in the cable 27. The distance D is further depicted as the distance from the center of the bend die 30 to the cut plane 39. In FIG. 5, the cable 47 is shown to be cut at a gap 44. The gap 44 coincides with the cut plane 39 and the saw blade 38. When cutting the cable 47, the cut plane 39 is always parallel to the Y and Z axes. From FIG. 5, a last leg length 45 is shown to reside between a plane 41 and the gap 44. The plane 41 coincides with one end of bend 43. The plane 41 is always perpendicular to the X axis.

Figure 6:
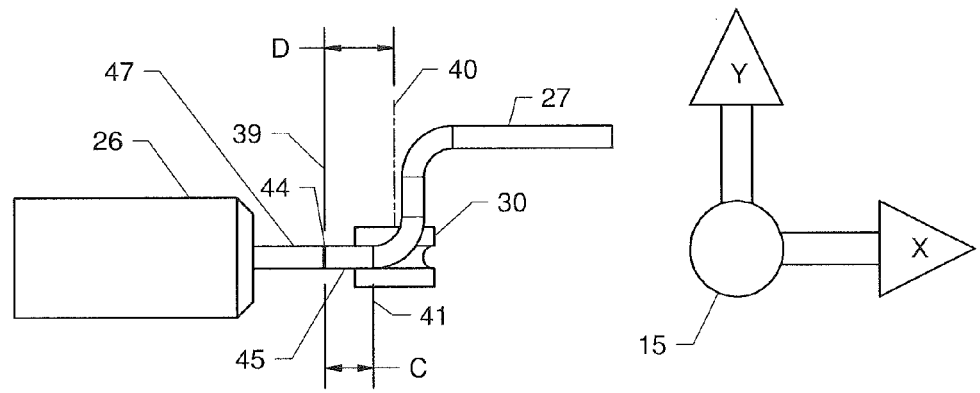
FIG. 6 shows the cable rotated out of the plane of bend and retracted in the negative X direction with respect to the fixed position of the bend die. The cable is also shifted out in the positive Z direction, allowing the cable to clear the bend die as the cable retracts.

FIG. 6 shows the cable 27, which is a bent piece, in a new position relative to the bend die 30. With the bend die 30 fixed in position relative to the saw blade 38, the cable 27 is shown shifted in the negative X direction. By doing so, the bend 43 becomes closer to the cut plane 39. Thus, a distance C from the cut plane 39 to the start of the bend 43 is less than the distance D. Now the last leg length 45 in FIG. 6 is in a position to be cut shorter than the last leg length 46 as depicted in FIG. 5.

Figure 7:
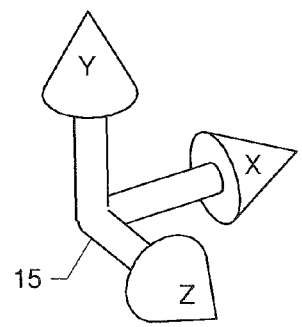
FIG. 7 shows an isometric view of FIG. 6 where the cable is pulled back in the negative X direction, further showing the distance between the cut plane and the start of the last bend.
Figure 7:
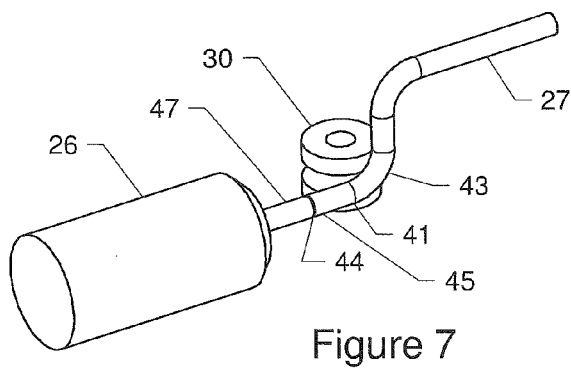

From FIGS. 6 and 7, the spindle 26 and the cable 27 are shifted out in the positive Z directions away from the bend die 30.

From FIGS. 6 and 7, the cable 27 is repositioned to allow the bend 43 to be closer to the cut plane 39. The cable 27 can only be repositioned by the spindle 26 prior to the saw blade 38 forming the gap 44 in cable 47.

In operation, from FIGS. 1 through 3, a long straight piece of the cable 47 is placed in the spindle 26. The spindle 26 then grips the cable 47. The carriage 12 and thus spindle 26 will then move in the x axis direction to present the cable 47 to the bend die 30, the wiper roller 32, and the clamp 37 for bend processing. With the cable 47 in position, the carriage 12 and the bend head 14 can make a series of computer coordinated moves to bend cable 27.

The cable 27 is bent by the main bend spindle 20 rotating the wiper roller 32 concentrically around the bend die 30. All during this time the clamp 37 holds the cable 27 firmly against the bend die 30.

From FIGS. 5 through 7, after the last bend has been made, the controller can then get ready to cut or sever the formed part from the long length of the cable 47 concentrically located in the spindle 26. In order to cut the last leg length 45 less than distance D, the following coordinated operations are performed.

Starting from FIG. 5, the wiper roller 32 and the clamp 37 both retract away from the bend die 30. With the spindle 26 firmly gripping the cable 47, the carriage 12 advances the cable 47 forward in the positive X direction just enough for the cable 27 to clear the bend die 30. Then, the spindle 26 rotates cable 27 out of the plane of the bend and about an axis parallel to the X axis. Then, the spindle 26 retracts, thereby pulling the cable 27 back with it a distance greater than the distance A. When retracting, the cable 27 is traveling in the negative X direction towards the saw blade 38.

From FIGS. 6 and 7, the cable 27 is now shown in one of numerous retracted positions where if the cable 27 is cut on the cut plane 39, the length of the last leg 45 would be less than the fixed distance D.

Once the cable 27 is in the retracted position, the saw blade 38 can descend in the negative Y direction, thus producing the gap 44. Once the gap 44 is imparted in the cable 47, cable 47 and cable 27 are consider severed, leaving the last leg length 45 less than the distance D.

As an alternate way of operation, after the spindle 26 has rotated the cable 27 out of the plane of the bend, the cable 27 can shift out in the positive Z direction prior to being retracted in the negative X direction by spindle 26. The amount of the shift out in the positive Z direction distance C, which is sufficient enough so that the cable 27, including the bend, suredly clears the sides of the bend die 30 upon being retracted in the negative X direction. The benefit of shifting the cable 27 out in the positive Z direction is it can minimize any interference that may arise between the cable 27 and the bend die 30 as the spindle 26 pulls back on the bent cable 27 in the negative X direction.

In the event the spindle 26 does not shift out prior to retracting the cable 27 in the negative X direction, the cable 27 would then have a tendency to flex out, or bow in the positive Z direction as the cable 27 is forced past the bend die 30. This could cause the gap 44 to be somewhat not perpendicular to the cable 47, and thus a square cut is not achieved at the end of the cable 27.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of cutting a cable mounted on a bending machine, wherein the bending machine comprises a spindle to grip the cable and move the cable in an x-axis direction, a bend die having an axis in a y-axis direction and about which the cable is bent to form a bent piece after the spindle moves the cable in the x-axis direction to reach the bend die, a wiper roller, a device to move the spindle along a rail in a z-axis direction, and a saw movable in the y-axis direction, having a cutting plane parallel to the y-axis and the z-axis perpendicular to the x and y-axes, wherein the cutting plane of the saw is a distance D closer to a start feed position from which the cable moves toward the bending die—in the x-axis direction, the method comprising:

moving the cable with the bent piece forward in the x-axis direction by a distance A by the spindle;

rotating the cable with the bent piece about the x-axis and out of the plane of the bend by the spindle;

moving the rotated cable and bent piece in the z-axis direction by a distance C by moving the spindle along the rail in the z-axis direction, to ensure that the rotated cable and bent piece clear the bend die upon a backing up of the rotated cable with the bent piece in the negative x-axis direction;

backing up the rotated cable with the bent piece in the negative x-axis direction a distance B the distance A by the spindle; and cutting the cable in the cutting plane at a last leg length adjacent to the bend by the saw.

\* \* \* \* \*